United States Patent
Liang et al.

(10) Patent No.: US 9,003,433 B2
(45) Date of Patent: Apr. 7, 2015

(54) OFF-PREMISE AND CODELESS PROCESS-CENTRIC BUSINESS MASHUP TO INTEGRATE BPEL BASED PROCESSES AND WEB 2.0 WIDGETS

(75) Inventors: Shuang Liang, Beijing (CN); Xiao Xing Liang, Beijing (CN); Xin Peng Liu, Beijing (CN); Chang Hua Sun, Beijing (CN); Xi Ning Wang, Beijing (CN); Liang Xue, Beijing (CN); Yu Chen Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 231 days.

(21) Appl. No.: 13/356,454

(22) Filed: Jan. 23, 2012

(65) Prior Publication Data
US 2012/0198481 A1 Aug. 2, 2012

(30) Foreign Application Priority Data
Jan. 30, 2011 (CN) .......................... 2011 1 0032142

(51) Int. Cl.
*G06F 9/54* (2006.01)
*G06F 9/44* (2006.01)
*G06Q 10/06* (2012.01)

(52) U.S. Cl.
CPC ................ *G06F 8/38* (2013.01); *G06Q 10/067* (2013.01)

(58) Field of Classification Search
CPC .................................. G06F 8/38; G06Q 10/067
See application file for complete search history.

(56) References Cited

U.S. PATENT DOCUMENTS

| | | | |
|---|---|---|---|
| 2005/0125771 A1* | 6/2005 | Vitanov et al. | 717/104 |
| 2008/0209348 A1* | 8/2008 | Grechanik et al. | 715/762 |
| 2009/0157728 A1* | 6/2009 | Fletcher et al. | 707/102 |
| 2009/0313601 A1 | 12/2009 | Baird et al. | |
| 2009/0327483 A1* | 12/2009 | Thompson et al. | 709/224 |
| 2010/0017783 A1* | 1/2010 | Brininstool et al. | 717/101 |
| 2010/0064357 A1 | 3/2010 | Baird et al. | |
| 2010/0125826 A1 | 5/2010 | Rice et al. | |
| 2010/0153865 A1 | 6/2010 | Barnes et al. | |

(Continued)

FOREIGN PATENT DOCUMENTS

| | | |
|---|---|---|
| CN | 101271460 A | 9/2008 |
| CN | 101923465 A | 12/2010 |
| WO | 2004046894 A2 | 6/2004 |

OTHER PUBLICATIONS

Han Nguyen, IBM mashup center: OpenSocial interoperability, Jan. 19, 2010 p. 1-8.*

(Continued)

*Primary Examiner* — H S Sough
*Assistant Examiner* — Syed Roni
(74) *Attorney, Agent, or Firm* — Lee Law, PLLC; Christopher B. Lee

(57) ABSTRACT

Business application logic corresponding to a business is generated according to requirements of the business. The business application logic includes Web services and Widgets. The Widgets in the business application logic are mashed up to create a Widget mashup application. An adaptation relationship is established between the Web services and the Widgets in the Widget mashup application. An executable business process is generated for the business based on the business application logic and the adaptation relationship. An executable mashup Widget application is generated based on the Widget mashup application and the adaptation relationship.

21 Claims, 5 Drawing Sheets

(56) References Cited

U.S. PATENT DOCUMENTS

2010/0180254 A1    7/2010   Petschnigg et al.
2010/0211580 A1*   8/2010   Sreekanth .................... 707/756

OTHER PUBLICATIONS

Amin Anjomshoaa, et al., Combining and Integrating Advanced IT-Concepts with Semantic Web Technology Mashups Architecture Case Study, Proceedings of the 2nd Asian Conference on Intelligent Information and Database Systems, ACIIDS, Mar. 2010, pp. 13-22, LNAI 5990, Springer-Verlag Berlin Heidelberg, Published at: http://publik.tuwien.ac.at/files/PubDat_187595.pdf.

Biorn Biornstad, et al., Let It Flow: Building Mashups with Data Processing Pipelines, Service-Oriented Computing—ICSOC 2007 Workshops, 2009, pp. 15-28 (plus one citation page), Springer-Verlag Berlin Heidelberg, Published at: http://www.jopera.org/files/jopera_mashup07.pdf.

Alessandro Bozzon, et al., A Conceptual Modeling Approach to Business Service Mashup Development, Proceedings of the 2009 IEEE International Conference on Web Services, 2009, pp. 751-758, IEEE Computer Society, Published at: http://www.computer.org/portal/web/csdl/doi/10.1109/ICWS.2009.24.

Adam D. Honore, The Case for Mashups in Capital Markets, Report, Dec. 2008, pp. 1-25, Aite Group, LLC, Boston, MA, USA.

Volker Hover, et al., Fast Platform: A Concept for user-centric, enterprise class Mashups, Proceedings of the 5th Conference of Professional Knowledge Management, Mar. 2009, pp. 1-4 (plus one citation page), Gesellschaft fur Informatik, Published.

Author Unknown, JackBe Enterprise Mashup Software, Website/page, Oct. 16, 2010, p. 1, JackBe Corporation, Published at: http://web.archive.org/web/20101016112013/http://www.jackbe.com/.

Ali Kheirolomoom, The Era of Collaborative Process-Centric Applications, White Paper, Jan. 2009, pp. 1-11, Serena Software, Inc., Published at: http://www.serena.com/docs/repository/mashups/serena-business-mashups-wp-era_of_collaborative-process-centric-applications.pdf.

Author Unknown, Intel Mash Maker, Website/page, Jul. 26, 2010, p. 1, Intel Corporation, Published at: http://web.archive.org/web/20100726105339/http://mashmaker.intel.com/web/.

Paul Donnelly, et al., About Pipes, Website/page, Jan. 28, 2011, p. 1, Yahoo! Inc., Published at: http://web.archive.org/web/20110128135829/http://pipes.yahoo.com/pipes/.

Author Unknown, Business Mashups for CRM, Brief, 2008, pp. 1-2, Serena Software, Inc., Published at: http://www.serena.com/docs/repository/mashups/Solution-Brief-CRM.pdf.

Author Unknown, Business Mashups for HR, Brief, 2008, pp. 1-2, Serena Software, Inc., Published at: http://www.serena.com/docs/repository/mashups/Solution-Brief-HR.pdf.

Jing Gu, Authorized Officer/Examiner, The State Intellectual Property Office of the People's Republic of China (as International Searching Authority), PCT International Search Report and Written Opinion for Application No. PCT/CN2012/070747, Apr. 19, 2012, pp. 1-10, Beijing, P.R. China.

Author Unknown, Examiner, State Intellectual Property Office of the People's Republic of China, Examination Report for Chinese Application No. 201110032142.2 (English translation not available), Apr. 1, 2014, pp. 1-10, P.R. China.

* cited by examiner

US 9,003,433 B2

OFF-PREMISE AND CODELESS PROCESS-CENTRIC BUSINESS MASHUP TO INTEGRATE BPEL BASED PROCESSES AND WEB 2.0 WIDGETS

RELATED APPLICATIONS

This application claims priority to and claims the benefit of Chinese Patent Application Serial No. 201110032142.2 titled "METHOD AND APPARATUS FOR OFF-PREMISE AND CODELESS PROCESS-CENTRIC BUSINESS MASHUP TO INTEGRATE BPEL BASED PROCESSES AND WEB 2.0 WIDGETS," which was filed in the State Intellectual Property Office of the People's Republic of China on Jan. 30, 2011, and which is incorporated herein by reference in its entirety.

BACKGROUND

The present invention relates to Web service composition technology, and particularly, to a business mashup for integrating a Business Process Execution Language (hereinafter referred to as BPEL) based business process with Widgets.

In general, Web service composition technology is used to compose a new Web service with multiple Web services to describe a business process. For example, Web service oriented Business Process Execution Language (BPEL) is a Web service composition technology. Such Web service composition technology focuses on an assembly of existing Web services at an interface level.

Web service composition technology is usually on-premise and not web based. That is, the Web service composition design, development, and testing are conducted in local on-premise tools. Then, the composed Web service is deployed into a runtime environment. As described above, the traditional Web service composition technologies provide an on-premise software development platform to assemble different services and deploy the service composition into a runtime server. These service composition technologies rely on the Web services and the Service-oriented Architecture (SOA) technology, and are server centric.

BRIEF SUMMARY

A business mashup method includes generating business application logic corresponding to a business according to requirements of the business, where the business application logic includes Web services and Widgets; mashing up the Widgets in the business application logic to create a Widget mashup application; establishing an adaptation relationship between the Web services and the Widgets in the Widget mashup application; generating an executable business process for the business based on the business application logic and the adaptation relationship; and generating an executable mashup Widget application based on the Widget mashup application and the adaptation relationship.

A business mashup system includes an application logic generation apparatus that generates business application logic corresponding to a business according to requirements of the business, where the business application logic includes Web services and Widgets; a Widget mashup apparatus that mashes up the Widgets in the business application logic to create a Widget mashup application; an adaptation apparatus that establishes an adaptation relationship between the Web services and the Widgets in the Widget mashup application; a business process generation apparatus that generates an executable business process for the business based on the business application logic and the adaptation relationship; and a mashup Widget application generation apparatus that generates an executable mashup Widget application based on the Widget mashup application and the adaptation relationship.

A computer program product includes a computer readable storage medium including computer readable program code, where the computer readable program code when executed on a computer causes the computer to generate business application logic corresponding to a business according to requirements of the business, where the business application logic comprises Web services and Widgets; mash up the Widgets in the business application logic to create a Widget mashup application; establish an adaptation relationship between the Web services and the Widgets in the Widget mashup application; generate an executable business process for the business based on the business application logic and the adaptation relationship; and generate an executable mashup Widget application based on the Widget mashup application and the adaptation relationship.

DETAILED DESCRIPTION

Figure 1:
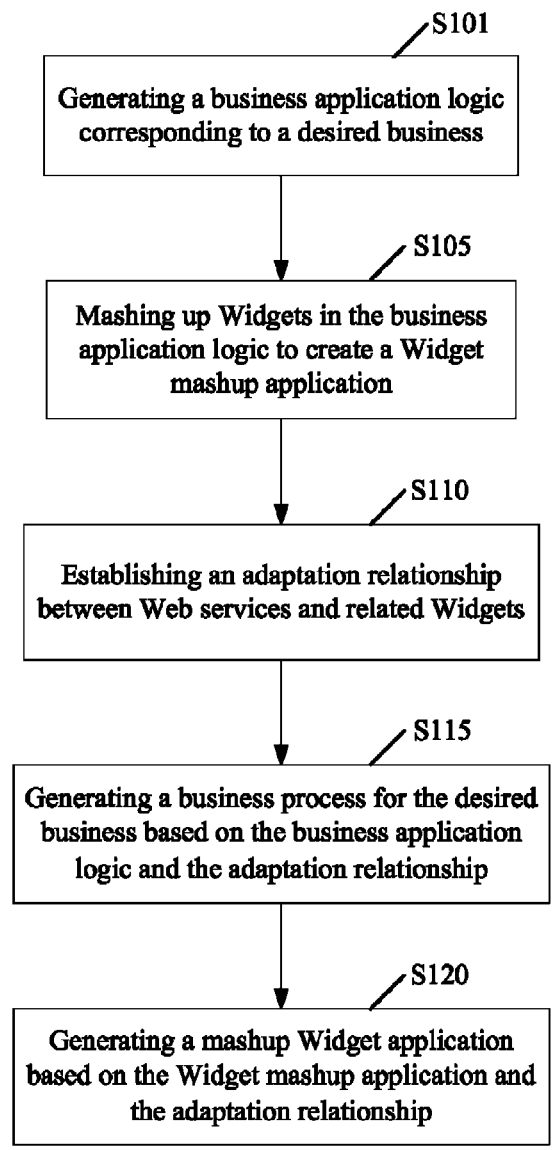
FIG. 1 is a flow chart of an example of an implementation of a business mashup method according to one embodiment of the present subject matter.

It is believed that the above and other objects, features and advantages of the present invention will become more apparent from the following detailed description of the preferred embodiments of the invention in conjunction with the drawings.

It should be noted that conception of the present subject matter resulted from recognition of certain limitations associated with Web service deployment. For example, it was observed that, after deployment, the Web service composition logic cannot be customized easily according to new service composition requirements. It was further recognized that, typically, if there is a new requirement for Web service composition, the Web service composition design, development, and testing needs to be re-conducted, and this is costly and takes a very long time. Thus, it was observed that the existing Web service composition technologies cannot flexibly support dynamic change of human interaction user interfaces. In addition, it was recognized that the traditional Web service composition technologies require users with necessary professional skills suitable to professional programmers, and are too hard for those without professional technical skills. It was recognized in the context of these limitations that "mashup," one of the core technologies of Web 2.0, compared to BPEL technology, provides an effective and self-served approach for Web service composition. In addition, it was determined that, compared to the BPEL technology, mashup technology is more coarse-grained at the application level and focuses on the user interface presentation and information level integration, which was determined to be lacking within process activities-level integration.

It was further determined that certain mashup tools provide graphical user interfaces and extensible sets of components, and thus may be used by non-professional users without relevant knowledge. However, several limitations to existing tools were discovered. For example, one tool focuses on data integration via Really Simple Syndication (RSS) or Atom feeds, but does not support user interface integration. Another tool provides a graphical user interface for composition of both data access applications and user interface components, but does not support services orchestration. Another tool adopts a Pipes-like approach for data mashup and allows a portal-like aggregation of user interface Widgets visualizing the output of such mashup, but does not support services orchestration. Another tool provides a browser plug-in which interprets annotations inside web pages allowing the personalization of web pages with Widgets, but the only information sources of the Mash Maker tool that can be used are the information represented by web pages that are visited through a browser that has been extended using a special plug-in, which greatly limits the sources that can be integrated (for example, RSS feeds and Atom feeds, etc. cannot be used). Yet another tool provides an on-premise tool to help users to develop the automated business process by drawing workflows that combine existing contents, applications, and services instead of writing code, but the users still need to download, install, and use the on-premise tool to develop the business process and mashups. In addition, the user interface composition and services orchestration are complex and do not depend on the Widget standard technologies, so this tool cannot be easily recombined or integrated with other mashup tools.

The present subject matter improves business mashup construction, upgrade, and maintenance by providing for integration of a Business Process Execution Language (BPEL) based business process with Widgets, as described above and in more detail below. As such, improved business mashup construction, upgrade, and maintenance may be obtained through the subject matter described herein.

The present subject matter provides a new business mashup technology capable of providing an off-premise business process development platform to integrate BPEL-based business processes and Widgets and to enable the business processes to support mashup Widget applications. In addition, the present subject matter is suitable for non-professional users.

FIG. 1 is a flow chart of an example of an implementation of a business mashup method according to one embodiment of the present subject matter. The example implementation will be described below in detail in conjunction with FIG. 1.

As shown in FIG. 1, in step S101, according to requirements of a desired business, a business application logic corresponding to the business is generated. In the example, firstly, according to the business requirements, Web service metadata and Widget metadata related to the business are acquired as components of the business application logic.

The Web service metadata may be in the form of Service-oriented Architecture (SOA) metadata and stored in a service metadata registry. Centralized access to the service metadata registry may discover, use, and reuse the service metadata (e.g., Web Services Description Language (WSDL) files, XML Structure Definition (XSD) files, etc.). The Widget is a plug-in or application executable on web pages for implementing a certain function. In this example implementation, the Widget complies with the iWidget specification. The available Widgets are stored in a corresponding Widget registry, and these Widgets may be discovered, used, and reused by centralized access to the Widget registry.

When the Web service metadata are to be acquired, the Web service metadata related to the desired business are populated from the service metadata registry. These Web service metadata may include an operation interface and data type, such as WSDL, XML structure, etc. As these Web service metadata may come from different files, the Web service metadata are further assembled. Then, the Widget metadata related to the desired business are populated from the Widget registry. The Widget metadata may contain markup language content that is rendered and may be supported by JavaScript® files for client-side scripting and cascading style sheet (CSS) files for styling the markup language content.

Then, the business application logic is composed with the acquired Web service metadata and Widget metadata, where the Web Service metadata form the Web services in the business application logic and the Widget metadata form the Widgets in the business application logic. In the business application logic, the Web services are used to implement the desired business, and the Widgets may provide the human interaction interfaces to receive user input.

A pseudo code example in which the data format based on JavaScript® Objection Notation (JSON) is used to express the business application logic on the reference implementation is shown below.

```
{
    "VARIABLE": [
        {"type": "string", "name": "firstName" },
        ...
        { "type": "http://HelloWorld:Incentive", "name": "incentiveVar",
          "location": "http://{ip}:{port}/a25fb2a2-e0a6-46a9.b4ee.d701eld7ee8f"},
        ...
    ],
    "activities": {
        "WEBSERVICE": [
            {"output": [...],
            "interface": "HelloWorldProcessPartner",
            "name": "receivehttp4_Receive",
            "location": " http://{ip}:{port}/Content/f1063cf1-a8d0-40b4.af01.a24289a20167",
            "source": [...],
            "target": [...],
```

```
            "operation": "startHelloWorldProcess",
            "portType": "HelloWorldProcess"}
    ],
    "REST": [
        {       "password": "pwd",
            "href": "http://localhost:8080/resources/incentive/{firstName}",
            "output": [. . .],
            "name": "Rest_Get",
            "location": " http://{ip}:{port}/Content/1dc2b51d-e5ea-4a71.bc59.f81689f85934",
            "httpMethod": "GET",
            "source": [. . .],
            "target": [. . .]
            "username": "user"          },
        {       . . .
                "httpMethod": "POST",
                . . . },
            . . .
    ],
    "WIDGET": [
        {       "id": "http://ibm.com/samples/Widgets/widiget1",
            "name": "SampleWidiget",
            "version":"1.0" ,
            "source": [. . .],
            "target": [. . .],
            "context": [. . .]      }
    ],
    . . .
    }
}
```

It can be seen that in this example business application logic, the "WEBSERVICE" part describes the Web services, while the "REST" and "WIDGET" parts describe the Widgets.

Next, in step S105, the Widgets in the business application logic generated in step S101 are mashed up to create a Widget mashup application. In this example implementation, the mashup may be performed using a web-based mashup tool. When a mashup is performed, the Widgets are discovered in the generated business application logic, and are assembled based on events to generate the Widget mashup application; that is, a linkage is built between the Widgets in the Widget mashup application based on the events so that the Widgets may share information with each other. In this example implementation, two types of events may be used: a "published" event (which means that the Widget publishes some data), and a "handled" event (which means that the Widget receives some data from other Widgets). The Widget mashup application generated in step S105 is also presented as a Widget.

In step S110, an adaptation relationship is established between the Web services and the related Widgets in the Widget mashup application. The linkage between the Web services and the Widgets has already been established at the application level from the generated business application logic. In order to enable the Web services to interact with the Widgets during the business process runtime, the adaptation relationship is established between the Web services and the Widgets at the underlying layer. Specifically, the respective transformation relationships on information format and transport protocol between the Web services and the related Widgets are established. The bi-directional linkage between the Web services and the Widget may be established by means of adaptation, thus during the business process runtime, the operations and input/output parameters from the Web services may be transformed and passed to the corresponding Widgets, and the information from the Widgets may be transformed and passed to the corresponding Web services to initialize the Web services or resume some activities within the Web services.

In step S115, the business process for the desired business is generated based on the business application logic generated in step S101 and the adaptation relationship established in step S110. In this example implementation, firstly, a BPEL-based application is composed with the Web services in the business application logic based on the business application logic and the adaptation relationship. As described above, BPEL technology may be used to perform composition of the Web services. The BPEL-based application is an intermediate application format that is independent of a specific runtime environment. Then, according to the actual runtime environment, the BPEL-based application is transformed into an executable BPEL-based business process. The business process is in the form of a binary and can run in the BPEL runtime environment.

In step S120, an executable mashup Widget application is generated based on the Widget mashup application generated in step S105 and the adaptation relationship generated in step S110. The executable mashup Widget application may be deployed directly into the Widget runtime environment.

Figure 2:
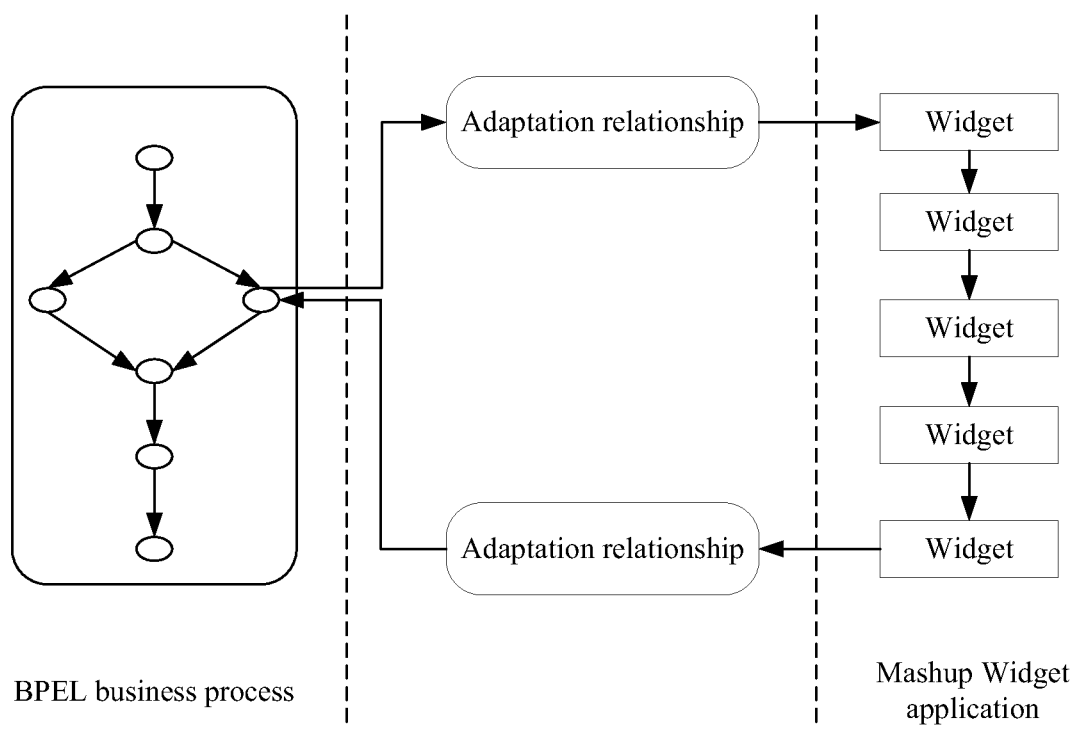
FIG. 2 is a schematic diagram an example of an implementation of the adaptation between a BPEL business process and a mashup Widget application of FIG. 1 according to one embodiment of the present subject matter.

FIG. 2 is a schematic diagram of an example of an implementation of the adaptation between the BPEL business process generated in step S115 and the mashup Widget application generated in step S120 according to one embodiment of the present subject matter. For the sake of clarity, FIG. 2 only shows the adaptation between one Web service in the BPEL business process and the Widgets. It is understood that those skilled in the art may extend this example for a situation for multiple Web services based upon the teachings herein.

The BPEL business process is showed on the left side of FIG. 2, and each node within the BPEL business process represents a Web service. The Widgets related to the Web service in the BPEL business process are shown on the right side of FIG. 2. It can be seen that the bi-directional linkage is built between the Web service in the BPEL business process and the related Widgets through adaptation. The operations and input/output parameters by the Web service to the Widgets are transmitted to the Widget after transformations on the information format and transport protocol, while the information obtained from the Widget runtime or received from the outside is also transmitted to the Web service after transformations on the information format and transport protocol.

It can be seen from the above description that the business mashup method of this example implementation provides the Off-Premise business process development platform, and that non-professional users may develop the desired business processes without coding. The present subject matter generates the business application logic by combining the Web services and the Widgets, and creates the Widget mashup application to provide the human interaction user interface, which enables the BPEL business process to support the mashup user interface based human interaction so that the process-centric business mashup may better reflect changes of the business requirements. In addition, the business mashup method of the present subject matter establishes the bi-directional linkage between the Web services and the Widgets by the adaptation of the Web services and the Widgets, so that the process activities may be automated by integrating Widgets, Web services, and data.

Figure 3:
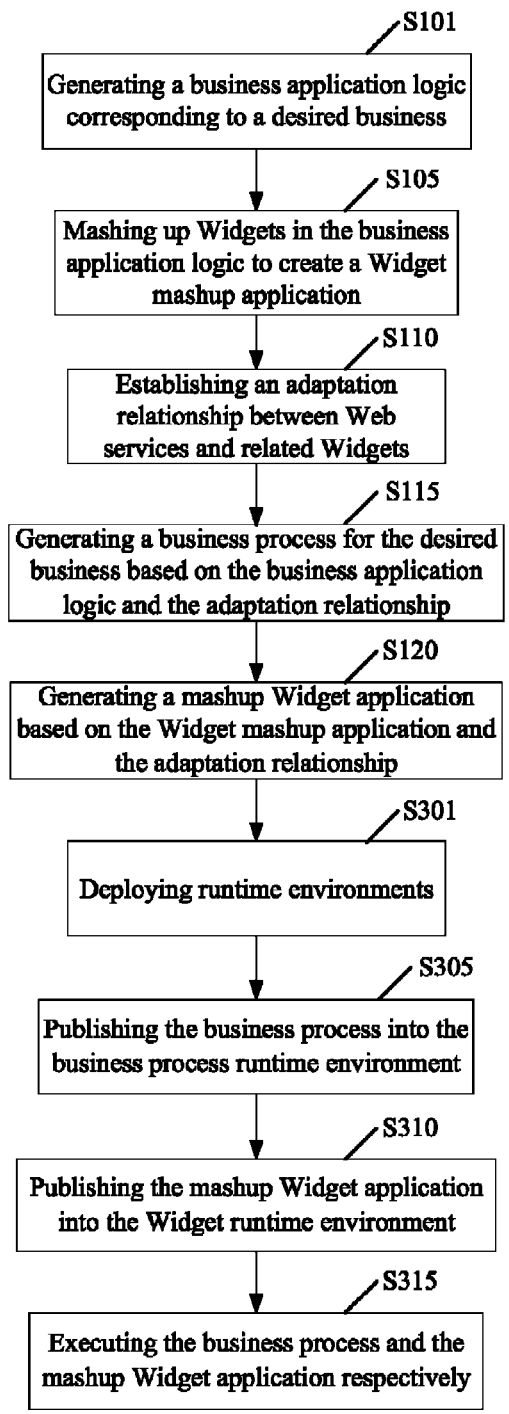
FIG. 3 is a flow chart of an example of an implementation of a business mashup method according to another embodiment of the present subject matter.

FIG. 3 is a flow chart of an example of an implementation of a business mashup method according to another embodiment of the present subject matter. This example implementation will be described below in detail in conjunction with FIG. 3, where the same reference numbers are used for the same parts as in the previous example and the description thereof is omitted for brevity.

In the embodiment shown in FIG. 3, the steps S101 through S120 are identical to those in the embodiment shown in FIG. 1.

After the above steps are performed, in step S301, the runtime environments, including a business process runtime environment and a Widget runtime environment, are deployed. In this embodiment, the business process runtime environment and the Widget runtime environment are provided automatically and deployed leveraging distributed (e.g., cloud) computing capabilities. For example, the business process runtime environment is the specific BPEL runtime environment, and the Widget runtime environment is the specific Widget runtime environment.

In step S305, the BPEL business process generated in step S115 is published into the business process runtime environment. In this example, the publishing of the BPEL business process is performed to automatically provide the BPEL business process to the specific BPEL runtime environment using the distributed (e.g., cloud) computing capabilities.

In step S310, the mashup Widget application generated in step S120 is published into the Widget runtime environment. Also, the publishing of the mashup Widget application is performed to automatically provide the mashup Widget application to the specific Widget runtime environment using the distributed (e.g., cloud) computing capabilities.

In step S315, the BPEL business process and the mashup Widget application are executed in the business process runtime environment and the Widget runtime environment, respectively. During the runtime, the BPEL business process and the mashup Widget application may exchange information, as described above, with each other via adaptation.

It can be seen from the above description that the business mashup method of this example implementation further provides the automatic deployment using the distributed (e.g., cloud) computing capabilities, and it may automatically provide the business process runtime environment and the Widget runtime environment, and deploy the BPEL business process and the mashup Widget application into the corresponding runtime environment.

Figure 4:
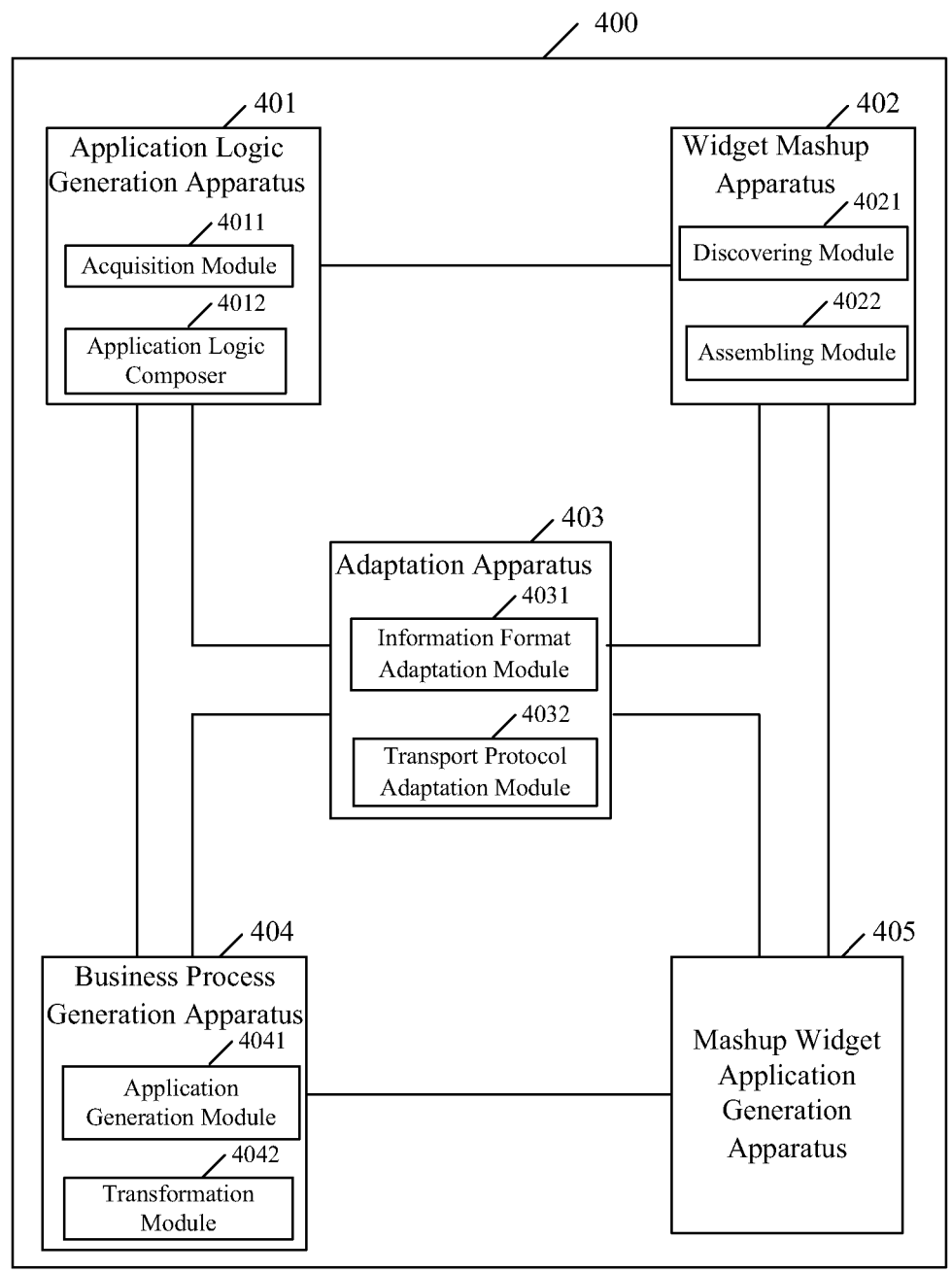
FIG. 4 is a schematic block diagram of an example of an implementation of a business mashup system according to one embodiment of the present subject matter.

Under the same inventive concept, FIG. 4 is a schematic block diagram of an example of an implementation of a business mashup system 400 according to one embodiment of the present subject matter. The example implementation will be described below in detail in conjunction with FIG. 4.

As shown in FIG. 4, the business mashup system 400 of this example implementation includes an application logic generation apparatus 401 that generates the business application logic corresponding to the desired business based on the requirements of the business, where the business application logic includes the Web services and the Widgets. A Widget mashup apparatus 402 mashes up the Widgets in the business application logic generated in the application logic generation apparatus 401 to create the Widget mashup application. An adaptation apparatus 403 establishes the adaptation relationship between the Web services in the business application logic and the Widgets in the Widget mashup application. A business process generation apparatus 404 generates the business process for the desired business based on the business application logic and the adaptation relationship. A mashup Widget application generation apparatus 405 generates the mashup Widget application based on the Widget mashup application and the adaptation relationship.

When the business application logic is to be generated, in the application logic generation apparatus 401, an acquisition module 4011 acquires the business-related Web service metadata and Widget metadata. As described above, the Web service metadata and the Widget metadata are stored in the respective registries, and may be discovered, used, and reused by accessing the corresponding registry. In this example, the acquisition module 4011 includes a service assembler that populates the related Web service metadata from the registry storing the Web service metadata and assembles the Web service metadata, and includes a Widget populating unit that populates the Widget metadata from the registry storing the Widgets.

After the assembled Web service metadata and the Widget metadata are acquired by the acquisition module 4011, an application logic composer 4012 composes the business application logic with these Web service metadata and Widget metadata, where the Web service metadata form the Web services, and the Widget metadata form the Widgets.

For the generated business application logic, in the Widget mashup apparatus 402, a discovering module 4021 discovers the Widgets in the business application logic, and an assembling module 4022 assembles these Widgets based on events to generate the Widget mashup application. When the Widgets are assembled, the linkage between the Widgets is established via the events. As described above, the events include the published event indicating that the Widget publishes the data and the handled event indicating that the Widget receives the data from other Widgets. Multiple Widgets in the business application logic may be mashed up into one Widget by the Widget mashup apparatus 402.

The linkage is established between the Web services and the Widgets at the application level from the business application logic, and in order to provide the bi-directional linkage between the Web services and the Widgets during the runtime, the adaptation relationship is established between the Web services and the Widgets in the Widget mashup application. Thus, in the adaptation apparatus 403, an information format adaptation module 4031 establishes the transformation relationship on information format between the Web services and the related Widgets, and a transport protocol adaptation module 4032 establishes the transformation relationship on transport protocol between the Web services and the related Widgets. Thus, during runtime, the operations and input/output parameters from the Web services are transmitted to the Widget mashup application via the adaptation apparatus 403, and the information from the Widgets are provided to the Web services via the adaptation apparatus 403.

In the business process generation apparatus 404, an application generation module 4041 composes the BPEL-based application with the Web services in the business application logic based on the generated business application logic and the adaptation relationship. The BPEL application is independent of a specific runtime environment, so the transformation of the BPEL application may be performed according to the actual runtime environment. A transformation module 4042 transforms the BPEL application into an executable business process according to the runtime environment. In the mashup Widget application generation apparatus 405, the mashup Widget application is generated based on the Widget mashup application and the adaptation relationship.

It should be noted that the business mashup system 400 of this example implementation may operatively implement the business mashup method shown in FIG. 1.

Figure 5:
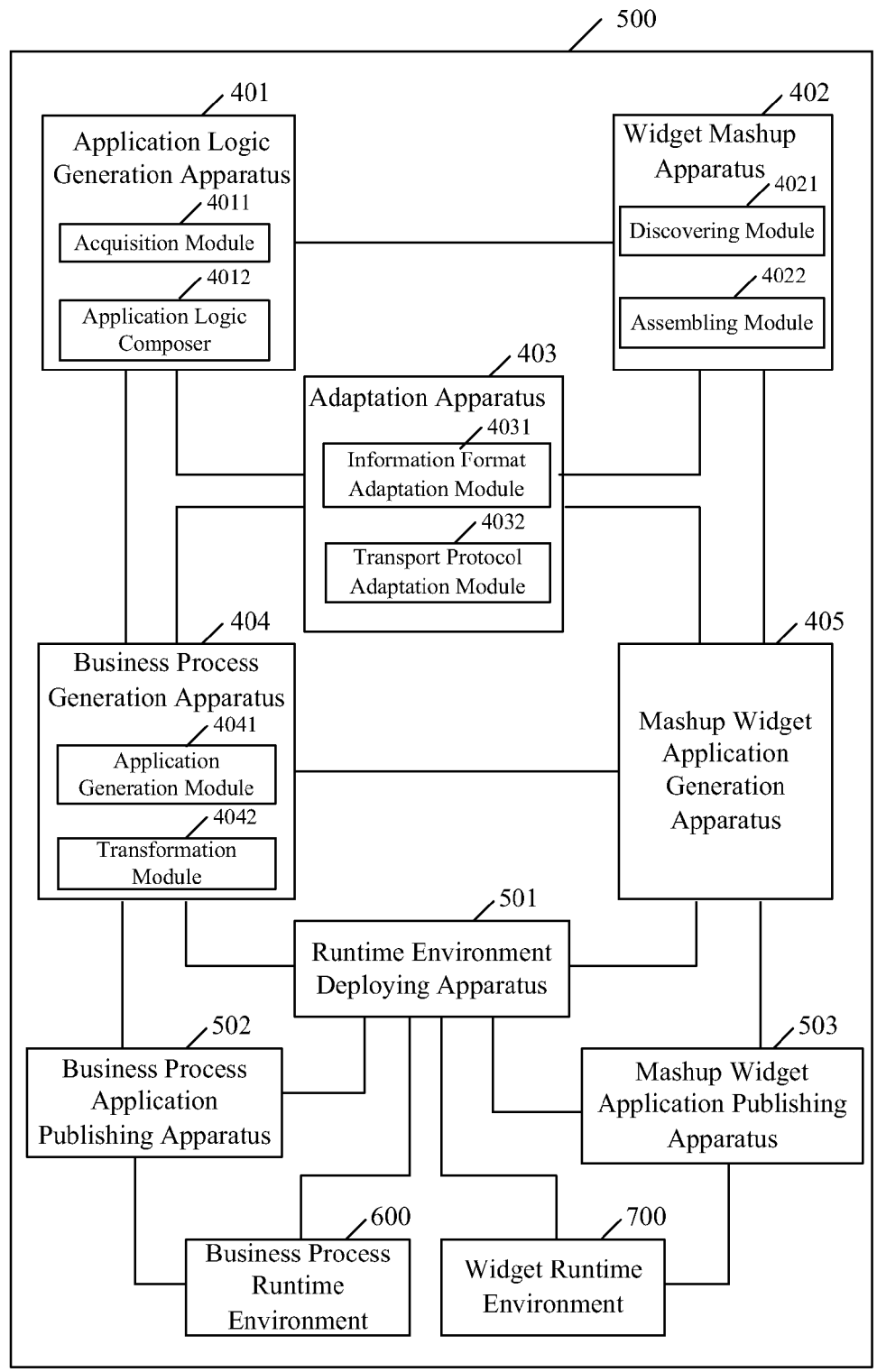
FIG. 5 is a schematic block diagram of an example of an implementation of a business mashup system according to another embodiment of the present subject matter.

FIG. 5 is a schematic block diagram of an example of an implementation of a business mashup system 500 according to another embodiment of the present subject matter. The example implementation will be described below in detail in conjunction with FIG. 5, where the same reference numbers are used for the same parts as in the previous example and the description thereof is omitted for brevity.

Besides the application logic generation apparatus 401, the Widget mashup apparatus 402, the adaptation apparatus 403, the business process generation apparatus 404, and the mashup Widget application generation apparatus 405, the system 500 shown in FIG. 5 further includes a runtime environment deploying apparatus 501 that deploys the runtime environments including a business process runtime environment 600 and a Widget runtime environment 700. A business process application publishing apparatus 502 publishes the business process into the business process runtime environment 600, and a mashup Widget application publishing apparatus 503 publishes the mashup Widget application into the Widget runtime environment 700.

In the runtime environment deploying apparatus 501, the business process runtime environment 600 and the Widget runtime environment 700 are provided automatically using the distributed (e.g., cloud) computing capabilities, and the business process application publishing apparatus 502 and the mashup Widget application publishing apparatus 503 are invoked. In this example implementation, the business process runtime environment 600 is the specific BPEL runtime environment and the Widget runtime environment 700 is the specific Widget runtime environment. The business process application publishing apparatus 502 and the mashup Widget application publishing apparatus 503 provide the business process and the mashup Widget application to the business process runtime environment 600 and the Widget runtime environment 700 using the distributed (e.g., cloud) computing capabilities, respectively.

During the runtime, the business process is executed in the business process runtime environment 600, the mashup Widget application is executed in the Widget runtime environment 700, and the business process and the mashup Widget application may exchange the information with each other via the adaptation apparatus 403.

It should be noted that the business mashup system 500 of this embodiment may operatively implement the business mashup method shown in FIG. 3.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A business mashup method, comprising:
    generating business application logic syntax corresponding to a business according to requirements of the business, where the business application logic syntax comprises both of a description of Web services and a description of Widgets;
    mashing up the Widgets described in the business application logic syntax to create a Widget mashup application;
    establishing an adaptation relationship between the Web services and the Widgets in the Widget mashup application;
    generating an executable business process for the business based on the business application logic syntax and the adaptation relationship; and
    generating an executable mashup Widget application based on the Widget mashup application and the adaptation relationship.

2. The method of claim 1, where generating the business application logic syntax corresponding to the business according to the requirements of the business comprises:
    acquiring Web service metadata and Widget metadata related to the business; and
    composing the business application logic syntax using the acquired Web service metadata and the Widget metadata, where the Web service metadata forms the description of the Web services in the business application logic syntax and the Widget metadata forms the description of the Widgets in the business application logic syntax.

3. The method of claim 2, where acquiring the Web service metadata and the Widget metadata related to the business comprises:
    populating the Web service metadata related to the business from a service metadata registry that stores the Web service metadata;
    assembling the Web service metadata; and
    populating the Widget metadata from a Widget registry that stores the Widgets.

4. The method of claim 1, where mashing up the Widgets described in the business application logic syntax to create the Widget mashup application comprises:
 discovering the Widgets using the description of the Widgets in the business application logic syntax; and
 assembling the Widgets based on events to generate the Widget mashup application, where the events comprise a published event and a handled event.

5. The method of claim 1, where establishing the adaptation relationship between the Web services and the Widgets in the Widget mashup application comprises:
 establishing a transformation relationship on information format between the Web services and the Widgets; and
 establishing a transformation relationship on transport protocol between the Web services and the Widgets.

6. The method of claim 1, where generating the executable business process for the business based on the business application logic syntax and the adaptation relationship comprises:
 composing a Business Process Execution Language (BPEL) based application with the Web services based on the business application logic syntax and the adaptation relationship; and
 transforming the BPEL based application into the executable business process according to a runtime environment.

7. The method of claim 1, further comprising:
 deploying runtime environments comprising a business process runtime environment and a Widget runtime environment;
 publishing the executable business process into the business process runtime environment;
 publishing the executable mashup Widget application into the Widget runtime environment;
 executing the executable business process in the business process runtime environment; and
 executing the executable mashup Widget application in the Widget runtime environment;
 where the executable business process and the executable mashup Widget application exchange information with each other based on the adaptation relationship during runtime.

8. A business mashup system, comprising:
 a memory; and
 at least one processor programmed to:
 generate business application logic syntax corresponding to a business according to requirements of the business, where the business application logic syntax comprises both of a description of Web services and a description of Widgets;
 mash up the Widgets described in the business application logic syntax to create a Widget mashup application;
 establish an adaptation relationship between the Web services and the Widgets in the Widget mashup application;
 generate an executable business process for the business based on the business application logic syntax and the adaptation relationship; and
 generate an executable mashup Widget application based on the Widget mashup application and the adaptation relationship.

9. The system of claim 8, where, in being programmed to generate the business application logic syntax corresponding to the business according to the requirements of the business, the at least one processor is programmed to:
 acquire Web service metadata and Widget metadata related to the business; and
 compose the business application logic syntax using the acquired Web service metadata and the Widget metadata, where the Web service metadata forms the description of the Web services in the business application logic syntax and the Widget metadata forms the description of the Widgets in the business application logic syntax.

10. The system of claim 9, where, in being programmed to acquire the Web service metadata and the Widget metadata related to the business, the at least one processor is programmed to:
 populate the Web service metadata related to the business from a service metadata registry that stores the Web service metadata;
 assemble the Web service metadata; and
 populate the Widget metadata from a Widget registry that stores the Widgets.

11. The system of claim 8, where, in being programmed to mash up the Widgets described in the business application logic syntax to create the Widget mashup application, the at least one processor is programmed to:
 discover the Widgets using the description of the Widgets in the business application logic syntax; and
 assemble the Widgets based on events to generate the Widget mashup application, where the events comprise a published event and a handled event.

12. The system of claim 8, where, in being programmed to establish the adaptation relationship between the Web services and the Widgets in the Widget mashup application, the at least one processor is programmed to:
 establish a transformation relationship on information format between the Web services and the Widgets; and
 establish a transformation relationship on transport protocol between the Web services and the Widgets.

13. The system of claim 8, where, in being programmed to generate the executable business process for the business based on the business application logic syntax and the adaptation relationship, the at least one processor is programmed to:
 compose a Business Process Execution Language (BPEL) based application with the Web services based on the business application logic syntax and the adaptation relationship; and
 transform the BPEL based application into the executable business process according to a runtime environment.

14. The system of claim 8, where the at least one processor is further programmed to:
 deploy runtime environments comprising a business process runtime environment and a Widget runtime environment;
 publish the executable business process into the business process runtime environment; and
 publish the executable mashup Widget application into the Widget runtime environment;
 execute the executable business process in the business process runtime environment; and
 execute the executable mashup Widget application in the Widget runtime environment;
 where the executable business process and the executable mashup Widget application exchange information with each other through the adaptation relationship during runtime.

15. A computer program product comprising a non-transitory computer readable storage medium including computer readable program code, where the computer readable program code when executed on a computer causes the computer to:
 generate business application logic syntax corresponding to a business according to requirements of the business, where the business application logic syntax comprises both of a description of Web services and a description of Widgets;

mash up the Widgets described in the business application logic syntax to create a Widget mashup application;

establish an adaptation relationship between the Web services and the Widgets in the Widget mashup application;

generate an executable business process for the business based on the business application logic syntax and the adaptation relationship; and generate an executable mashup Widget application based on the Widget mashup application and the adaptation relationship.

16. The computer program product of claim 15, where in causing the computer to generate the business application logic syntax corresponding to the business according to the requirements of the business, the computer readable program code when executed on the computer causes the computer to:

acquire Web service metadata and Widget metadata related to the business; and compose the business application logic syntax using the acquired Web service metadata and the Widget metadata, where the Web service metadata forms the description of the Web services in the business application logic syntax and the Widget metadata forms the description of the Widgets in the business application logic syntax.

17. The computer program product of claim 16, where in causing the computer to acquire the Web service metadata and the Widget metadata related to the business, the computer readable program code when executed on the computer causes the computer to:

populate the Web service metadata related to the business from a service metadata registry that stores the Web service metadata;

assemble the Web service metadata; and populate the Widget metadata from a Widget registry that stores the Widgets.

18. The computer program product of claim 15, where in causing the computer to mash up the Widgets described in the business application logic syntax to create the Widget mashup application, the computer readable program code when executed on the computer causes the computer to:

discover the Widgets using the description of the Widgets in the business application logic syntax; and assemble the Widgets based on events to generate the Widget mashup application, where the events comprise a published event and a handled event.

19. The computer program product of claim 15, where in causing the computer to establish the adaptation relationship between the Web services and the Widgets in the Widget mashup application, the computer readable program code when executed on the computer causes the computer to:

establish a transformation relationship on information format between the Web services and the Widgets; and establish a transformation relationship on transport protocol between the Web services and the Widgets.

20. The computer program product of claim 15, where in causing the computer to generate the executable business process for the business based on the business application logic syntax and the adaptation relationship, the computer readable program code when executed on the computer causes the computer to:

compose a Business Process Execution Language (BPEL) based application with the Web services based on the business application logic syntax and the adaptation relationship; and transform the BPEL based application into the executable business process according to a runtime environment.

21. The computer program product of claim 15, where the computer readable program code when executed on the computer further causes the computer to:

deploy runtime environments comprising a business process runtime environment and a Widget runtime environment;

publish the executable business process into the business process runtime environment;

publish the executable mashup Widget application into the Widget runtime environment;

execute the executable business process in the business process runtime environment; and execute the executable mashup Widget application in the Widget runtime environment;

where the executable business process and the executable mashup Widget application exchange information with each other based on the adaptation relationship during runtime.

* * * * *